US008889785B2

(12) United States Patent
Niino et al.

(10) Patent No.: US 8,889,785 B2
(45) Date of Patent: Nov. 18, 2014

(54) PRODUCTION METHOD OF THERMOPLASTIC RESIN COMPOSITION, MOLDED BODY, AND LIGHT EMISSION BODY

(75) Inventors: Hiroshi Niino, Hiroshima (JP); Mitsufumi Nodono, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 148 days.

(21) Appl. No.: 13/391,467

(22) PCT Filed: Aug. 19, 2010

(86) PCT No.: PCT/JP2010/063974
§ 371 (c)(1),
(2), (4) Date: May 4, 2012

(87) PCT Pub. No.: WO2011/021658
PCT Pub. Date: Feb. 24, 2011

(65) Prior Publication Data
US 2012/0214922 A1    Aug. 23, 2012

(30) Foreign Application Priority Data

Aug. 20, 2009  (JP) ................................ 2009-190963
Jan. 6, 2010   (JP) ................................ 2010-001246

(51) Int. Cl.
| | |
|---|---|
| *C08K 5/06* | (2006.01) |
| *C08L 33/08* | (2006.01) |
| *C08L 33/10* | (2006.01) |
| *C08L 33/12* | (2006.01) |
| *C08K 3/10* | (2006.01) |
| *C08K 3/16* | (2006.01) |
| *C08J 3/20* | (2006.01) |
| *C09K 11/02* | (2006.01) |
| *C08L 71/02* | (2006.01) |

(52) U.S. Cl.
CPC .................. *C08J 3/203* (2013.01); *C09K 11/02* (2013.01); *C08L 71/02* (2013.01); *C09K 2211/14* (2013.01)
USPC ........................... 524/560; 524/366; 524/413

(58) Field of Classification Search
CPC .............. C08K 3/10; C08K 3/16; C08K 5/06; C08K 2003/168; C08L 33/08; C08L 33/10; C08L 33/12
USPC .......................................... 524/366, 378, 413
See application file for complete search history.

(56) References Cited

U.S. PATENT DOCUMENTS

| | | |
|---|---|---|
| 2005/0049368 A1 | 3/2005 | Maruyama et al. |
| 2009/0192280 A1 | 7/2009 | Otoshi |

FOREIGN PATENT DOCUMENTS

| | | | | |
|---|---|---|---|---|
| CA | 2233976 A | * 3/1999 | ............... | C08K 3/22 |
| EP | 1 883 124 | 1/2008 | | |

(Continued)

OTHER PUBLICATIONS

Machine translation of JP 10-072552 A (Mar. 17, 1998).*

(Continued)

*Primary Examiner* — Vu A Nguyen
(74) *Attorney, Agent, or Firm* — Oblon, Spivak, McClelland, Maier & Neustadt, L.L.P.

(57) ABSTRACT

Disclosed is a production method of a thermoplastic resin composition which has a good light emission property of visible light by ultraviolet irradiation, the production method comprising: compounding 0.001 to 50 parts by mass of at least one of metal compound (B) selected from a metal complex (B1) and a metal halide (B2), and 0.001 to 30 parts by mass of a polyalkylene glycol compound (C), with respect to 100 parts by mass of a thermoplastic resin (A); and heating it at a temperature of 100 to 320° C.

11 Claims, 1 Drawing Sheet

(56) References Cited

FOREIGN PATENT DOCUMENTS

| EP | 2 067 839 | 6/2009 |
| JP | 10 072552 | 3/1998 |
| JP | 2005 096421 | 4/2005 |
| JP | 2007 185924 | 7/2007 |
| JP | 2008 238408 | 10/2008 |
| WO | 2007 138970 | 12/2007 |

OTHER PUBLICATIONS

International Search Report issued Sep. 28, 2010 in PCT/JP2010/063974 filed Aug. 19, 2010.
U.S. Appl. No. 13/504,492, filed Apr. 27, 2012, Niino.
Search Report in corresponding European application No. 10809999.5-1306, mailed on May 27, 2014.
Database WPI, Thomson Scientific, London, GB; An 1992-154569, XP-002724132 & JPH04-91136, Mar. 24, 1992.

* cited by examiner

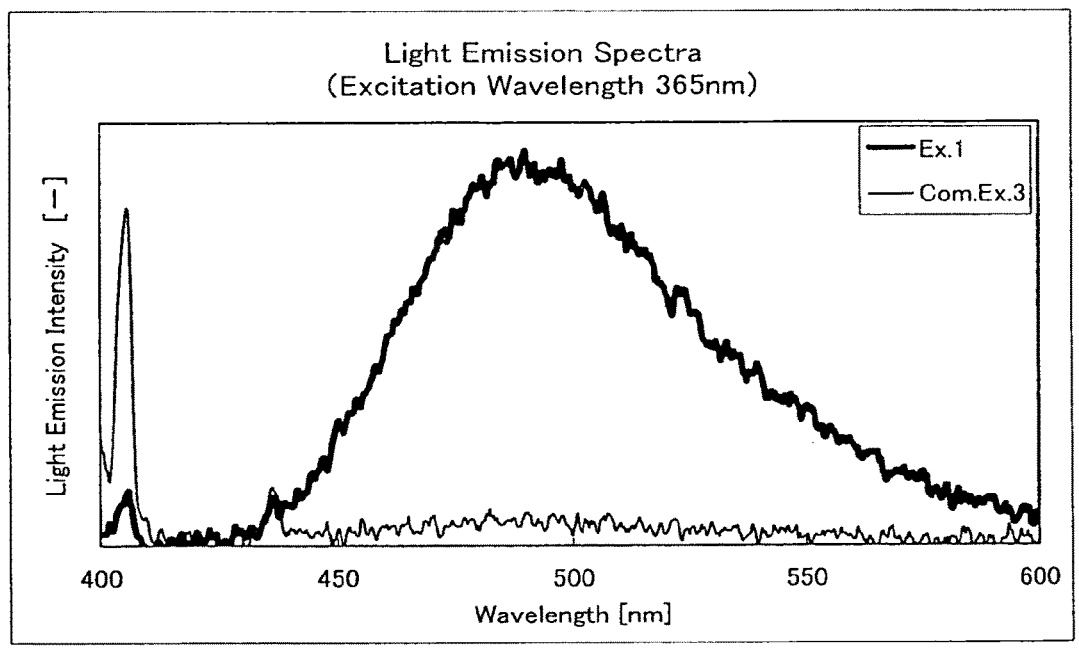

PRODUCTION METHOD OF THERMOPLASTIC RESIN COMPOSITION, MOLDED BODY, AND LIGHT EMISSION BODY

TECHNICAL FIELD

The present invention relates to a production method of a thermoplastic resin composition, a molded body obtained by molding a thermoplastic resin composition which is obtained by the production method, and a light emission body using the molded body.

BACKGROUND ART

It is known that some metal oxides and metal complexes emit a visible light by receiving irradiation of an ultraviolet. Using this property, the metal oxides and metal complexes are used for an optical material such as a fluorescent body.

The light emission property of the metal oxide and metal complex is thought to be due to the crystal condition and an electron donor type defect in the surface (a hole of interstitial metal and oxygen). It is known that metal oxides in high crystal condition and metal oxides in the surface of which an electron donor type defect is generated emit a visible light by receiving irradiation of an ultraviolet. Also, it is known that metal complexes emit a light when it returns to the ground state from the excited state in which is excited by receiving irradiation of an ultraviolet.

A thermoplastic resin composition containing a metal oxide is generally produced by kneading metal oxide fine particles and a thermoplastic resin, and is strongly influenced by particle diameter and aggregation state of the metal oxide fine particles. If the particle diameter is large, light emission intensity is reduced or light emission is not provided. If aggregation of fine particles is progressed, light emission intensity is reduced or light emission is not provided.

In order to solve the problem, Patent document 1 proposes a production method of a thermoplastic resin composition in which a thermoplastic resin and a metal complex is heated. The molded body obtained by this method has ultraviolet absorptivity. This molded body may emit a visible light by receiving irradiation of an ultraviolet, but the emission intensity is not high.

PRIOR ART DOCUMENT

Patent Document

Patent document 1: JP 10-72552 A

SUMMARY OF THE INVENTION

Problem to be Solved by the Invention

An object of the present invention is to provide a production method of a thermoplastic resin composition and a molded body thereof, which have a good light emission property of visible light by ultraviolet irradiation.

Means of Solving the Problem

The present invention is a production method of a thermoplastic resin composition comprising: compounding 0.001 to 50 parts by mass of at least one of metal compound (B) selected from a metal complex (B1) and a metal halide (B2), and 0.001 to 30 parts by mass of a polyalkylene glycol compound (C), with respect to 100 parts by mass of a thermoplastic resin (A); and heating it at a temperature of 100 to 320° C.

Also, the present invention is a molded body obtained by molding a thermoplastic resin composition which is obtained by the production method.

Further, the present invention is a light emission body using the molded body.

Effect of the Invention

According to the present invention, provided is a molded body which has a good light emission property of visible light by ultraviolet irradiation. That is to say, provided is a molded body in which the wavelength of light is made long by light irradiation and in which the light emission intensity is high.

BRIEF DESCRIPTION OF DRAWINGS

FIG. 1 is light emission spectra of molded bodies at an excitation wavelength of 365 nm.

MODE FOR CARRYING OUT THE INVENTION

As a thermoplastic resin (A) of the present invention, a well-known thermoplastic resin can be used. Examples thereof include, for example, acrylic resins, styrene resins, olefin resins, polycarbonate resins, polyvinyl chloride resins, polyvinylidene chloride resins, polyimide resins, polyester resins, polyacetal resins, polyphenylene ether resins, polyethylene terephthalate resins, polybutylene terephthalate resins, polyarylate resins, polyphenylene sulfide resins, polyethersulfone resins, polyetherimide resins, polyether ether ketone resins, polyether ketone resins, and fluorine resins. This thermoplastic resin (A) may be used alone, or in combination with two or more kinds.

Among these thermoplastic resins (A), acrylic resins, styrene resins, olefin resins, polycarbonate resins, polyvinyl chloride resins, and polyester resins are preferable because they are melted in a temperature range of 100 to 320° C. Acrylic resins, styrene resins, olefin resins, and polycarbonate resins are more preferable. Also, acrylic resins, styrene resins, polycarbonate resins are furthermore preferable because they have a good compatibility with a polyalkylene glycol compound (C). Acrylic resins are particularly preferable because the molded body obtained has a good light emission property.

Examples of the acrylic resin include, for example, polymethyl methacrylates (PMMA); acrylic resins obtained by copolymerization of methyl methacrylate with another monomer such as styrene, α-methyl styrene, acrylonitrile, and various acrylates or methacrylates; polymers containing various acrylates or methacrylates as a main component; and acrylic resins obtained by graft copolymerization of a polymer containing a rubber such as acrylic rubbers, silicone rubbers, and butadiene rubbers, with another monomer such as methyl methacrylate, and various acrylates or methacrylate.

Examples of the styrene resin include, for example, polystyrenes (PS), high impact polystyrenes (HIPS), methyl methacrylate-styrene copolymers (MS), methyl methacrylate-butadiene-styrene copolymers (MBS), styrene-maleic anhydride copolymers (SMA), styrene-methacrylic acid copolymers (SMAA), styrene-α-methyl styrene copolymers, styrene-maleimide copolymers, acrylonitrile-styrene copolymers, α-methyl styrene-acrylonitrile copolymers, and alloys of this styrene resin with a polyphenylene ether resin.

Examples of the acrylonitrile-styrene copolymer include, for example, acrylonitrile-styrene copolymers (SAN), acrylonitrile-styrene-butadiene copolymers (ABS), acrylonitrile-styrene-acrylic rubber copolymers (AAS), acrylonitrile-styrene-chlorinated polyethylene copolymers (ACS), acrylonitrile-styrene-ethylene-propylene rubber copolymers (AES), and acrylonitrile-styrene-ethylene-vinyl acetate copolymers. Also, acrylonitrile-α-methyl styrene copolymers in which a styrene moiety is substituted with α-methyl styrene are included.

Examples of the olefin resin include, for example, polyethylene resins such as ultralow density polyethylenes, low density polyethylenes, linear low density polyethylenes, medium density polyethylenes, and high density polyethylenes; ethylene-vinyl acetate copolymers having a vinyl acetate unit content of 0.1 to 25% by mass; ethylene-acrylic acid copolymers having an acrylic acid unit content of 0.1 to 25% by mass; polypropylenes; ethylene-propylene block copolymers having an ethylene unit content 2 to 40% by mass; ethylene-propylene random copolymers having an ethylene unit content 0.5 to 10% by mass; polybutenes; ethylene-propylene rubbers; ethylene-propylene-diene rubbers; and cycloolefin resins (COP). Among these olefin resins, cycloolefin resins (COP), low density polyethylenes, high density polyethylenes, and polypropylenes are preferable because the molded body obtained has a good mechanical property.

Examples of polyvinyl chloride resin include, for example, vinyl chloride homopolymers; copolymers obtained by copolymerization of vinyl chloride with another monomer such as ethylene, propylene, acrylonitrile, vinylidene chloride, and vinyl acetate; and modified polyvinyl chloride resins in which MBS, ABS, a nitrile rubber, a chlorinated polyethylene, an ethylene vinyl alcohol-vinyl chloride graft copolymer, or various plasticizers is added to a polyvinyl chloride.

The mass average molecular weight of a thermoplastic resin (A) is preferably 1,000 to 1,000,000, more preferably 5,000 to 800,000, and furthermore preferably 10,000 to 500,000. When the mass average molecular weight of a thermoplastic resin (A) is 1,000 or more, the molded body obtained comes to have a good mechanical property. Also, when the mass average molecular weight of a thermoplastic resin (A) is 1,000,000 or less, the thermoplastic resin composition has a good moldability, whereby the metal oxide comes to be dispersed well in the molded body and the molded body obtained comes to have a high light emission intensity.

A metal compound (B) of the present invention is at least one compound selected from a metal complex (B1) and a metal halide (B2).

The kind of a metal of a metal compound (B) is any of elements which belong to Group 1 except for hydrogen, Group 2, Group 3 containing lanthanoid and actinoid, Group 4, Group 5, Group 6, Group 7, Group 8, Group 9, Group 10, Group 11, Group 12, Group 13 except for boron, Group 14 except for carbon, Group 15 except for nitrogen, phosphorus and arsenic, and Group 16 except for oxygen, sulfur, selenium and tellurium, in the periodic table. Examples thereof include, for example, Li, Na, K, Rb, Cs, Be, Mg, Ca, Sr, Ba, Sc, Y, La, Ce, Pr, Nd, Pm, Sm, Eu, Gd, Tb, Dy, Ho, Er, Tm, Yb, Lu, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, Sb, and Bi. This metal can appropriately be chosen in view of the semiconductor property of the metal oxide and the light emission property of the molded body obtained. Also, this metal may be used alone, or in combination with two or more kinds.

Among these metals, Zn, Al, Be, Dy, Eu, Sr, In, Yb, Co, and Ga are preferable because the molded body obtained has a good light emission property. Zn is more preferable.

Examples of the kind of a ligand which is bonded to a metal of a metal complex (B1) include, for example, carboxylic acids, β-diketones, keto esters, hydroxy carboxylic acids or the salts thereof, various Schiff bases, keto alcohols, polyvalent amines, alkanolamines, enol-type active hydrogen compounds, dicarboxylic acids, glycols, and ferrocenes.

Examples of the compound as a ligand which is bonded to a metal of a metal complex (B1) include, for example, formic acid, acetic acid, propionic acid, acetylacetone, tetrafluoroacetylacetone, ethylenediamine, triethylenediamine, ethylenetetramine, bispiperidine, cyclohexanediamine, tetraazacyclotetradecane, ethylenediamine tetraacetic acid, ethylenebis(guanide), ethylenebis(salicylamine), tetraethylene glycol, diethanolamine, triethanolamine, tartaric acid, glycine, triglycine, naphthyridine, phenanthroline, pentanediamine, salicylaldehyde, catechol, porphyrin, thiourea, 8-hydroxyquinoline, 8-hydroxychinaldine, β-aminoethyl mercaptan, bisacetylacetone ethylenediimine, Eriochrome Black T, oxine, quinaldinic acid salicylaldoxime, picolinic acid, dimethylglyoximato, dimethylglyoxime, α-benzoin oxime, N,N'-bis(1-methyl-3-oxobutylidene)ethylenediamine, 3-{(2-aminoethyl)amino}-1-propanol, 3-(aminoethylimino)-2-butane oxime, alanine, N,N'-bis(2-aminobenzylidene)ethylenediamine, α-Amino-α-methylmalonic acid, 2-{(3-aminopropyl)amino}ethanol, aspartic acid, 1-phenyl-1,3,5-hexanetrione, 5,5'-(1,2-ethanediyldinitro)bis(1-phenyl-1,3-hexanedione), 1,3-bis{bis[2-(1-ethylbenzimidazolyl)methyl]amino}-2-propanol, 1,2-bis(pyridine-α-aldimino)ethane, 1,3-bis{bis(2-pyridylethyl)aminomethyl}benzene, 1,3-bis{bis(2-pyridylethyl)aminomethyl}phenol, 2,6-bis{bis(2-pyridylmethyl)aminomethyl}-4-methylphenol, 2,2'-bipyridine, 2,2'-bipyrazine, hydrotris(1-pyrazolyl)borate ion, 3,4:9,10-dibenzo-1,5,8,12-tetraazacyclotetradecane-1,11-diene, 2,6-diacetylpyridine dioxime, dibenzyl sulfide, N-{2-(diethylamino)ethyl}-3-amino-1-propanol, o-phenylenebis (dimethylphosphine), 2-{2-(dimethylamino) ethylthio}ethanol, 4,4'-dimethyl-2,2'-bipyridine, N,N'-dimethyl-1,2-cyclohexanediamine, 1,2-bis (dimethylphosphino)ethane, 1,3-bis(diacetyl monoximeimino)propane, 3,3'-trimethylenedinitrobis(2-butane oxime)-1,5-diamino-3-pentanol dipivaloylmethane, 1,2-bis(diphenylphosphino)ethane, diethyldithiocarbamic acid ion, N,N'-bis{2-(N,N'-diethylaminoethyl) aminoethyl}oxamide, 7-hydroxy-4-methyl-5-azahept-4-en-2-one, 2-aminoethanol, N,N'-ethylenebis(3-carboxysalicylideneamine), 1,3-bis(3-formyl-5-methylsalicylideneamino)propane, 3-glycylamino-1-propanol, glycylglycine, N'-(2-hydroxyethyl) ethylenediamine triacetic acid, hexafluoroacetylacetone, histidine, 5,26:13,18-diimino-7,11:20,24-dinitrodibenzo[c, n]-1,6,12,17-tetraazacyclodocosyne, 2,6-bis{N-(2-hydroxyphenyl)iminomethyl}-4-methylphenol, 5,5,7,12,12,14-hexamethyl-1,4,8,11-tetraazacyclotetradecane-N,N"-diacetic acid, 1,2-dimethylimidazole, 3,3'-ethylenebis (iminomethylidyne)-di-2,4-pentanedione, N,N'-bis(5-amino-3-hydroxypentyl)malonamide, methionine, 2-hydroxy-6-methylpyridine, methyliminodiacetic acid, 1,1-dicyanoethylene-2,2-dithiol, 1,8-naphthyridine, 3-(2-hydroxyethylimino)-2-butanone oxime, 2,3,7,8,12,13,17,18-octaethylporphyrin, 2,3,7,8,12,13,17,18-octamethylporphyrin, oxalic acid, oxamide, 2-pyridylaldoxime, 3-{2-(2-pyridyl)ethylamino}-1-propanol, 3-(2-pyridylethylimino)-2-butanone oxime, 2-picolylamine, 3-(2-pyridylmethylimino)-2-butanone oxime, phosphorous acid dihydrogen ion, 3-n-propylimino-2-butanone oxime, proline, pyridine, N,N'-dipyridoxylideneethylenediamine, N-pyridoxylideneglycine, pyridine-2-thiol, 1,5-bis (salicylideneamino)-3-pentanol, salicylaldehyde, N-salicylidene methylamine, salicylic acid, N-(salicylidene)-N'-(1-methyl-3-oxobutylidene)ethylenediamine,
salicylideneamine, N,N'-disalicylidene-2,2'-biphenylylenediamine, N, N'-disalicylidene-2-methyl-2-(2-benzylthioethyl)ethylenediamine, N,N'-disalicylidene-4-aza-1,7-heptanediamine, N,N'-disalicylideneethylenediamine, N-salicylideneglycine, salicylaldoxime, N,N'-disalicylidene-o-phenylenediamine, N,N'-disalicylidenetrimethylenediamine, 3-salicylideneamino-1-propanol, tetrabenzo[b,f,j,n]-1,5,9,13-tetraazacyclohexadecyne, 1,4,7-triazacyclononane, 5,14-dihydrodibenzo[b,i]-1,4,8,11-tetraazacyclotetradecine, tris(2-benzimidazolylmethyl)amine, 6,7,8,9,16,17,18,19-octahydrodicyclohepta[b,j]-1,4,8,11-tetraazacyclotetradecene, 4,6,6-trimethyl-3,7-diazanon-3-ene-1,9-diol, tris(3,5-dimethyl-1-pyrazolylmethyl)amine, 2,2':6',2''-terpyridine, 5,7,7, 12,14,14-hexamethyl-1,4,8,11-tetraazacyclotetradecane, tetrahydrofuran, tris(2-pyridylmethyl)amine, N,N,N',N'-tetramethylurea, N,N'-bis(3-aminopropyl)oxamide, N,N,N', N'-tetrakis(2-pyridylmethyl)ethylenediamine, allcis-5,10, 15,20-tetrakis{2-(2,2'-dimethylpropionamide)
phenyl}porphyrin, 5,10,15,20-tetraphenylporphyrin, 1,4,7-tris(2-pyridylmethyl)-1,4,7-triazacyclononane, hydrotris(1-pyrazolyl)borate, 3,3',4-trimethyldipyrromethene, trimethylenediamine tetraacetic acid, 3,3',5,5'-tetramethyl dipyrromethene, and 5,10,15,20-tetrakis(p-triporphyrin). This compound as a ligand may be used alone, or in combination with two or more kinds.

Among these compounds as a ligand, acetic acid, acetylacetone, hexafluoroacetylacetone, ethylenediamine, bispiperidine, bipyrazine, cyclohexanediamine, tetraazacyclotetradecane, ethylenediamine tetraacetic acid, ethylenebis(guanide), ethylenebis(salicylamine), tetraethylene glycol, aminoethanol, glycine, triglycine, pentanediamine, pyridine, and thiourea are preferable because the molded body obtained has a good light emission property. Also, acetylacetone and acetic acid are more preferable because they have a sublimation property and accelerate the decomposition of a metal complex (B1) to a metal oxide. Acetylacetone is furthermore preferable.

Examples of the halogen element which is bonded to a metal of a metal halide (B2) include, for example, fluorine, chlorine, bromine, and iodine. This halogen element may be used alone, or in combination with two or more kinds. Among these halogen elements, chlorine and bromine are preferable because the molded body obtained has a good light emission property. Chlorine is more preferable.

This metal compound (B) may be used alone, or in combination with two or more kinds.

Among these metal compounds (B), they preferably have a high solubility to a thermoplastic resin (A) and also preferably have a sublimation property because they are dispersed well in the thermoplastic resin (A). Specifically, zinc acetylacetonate, aluminum acetylacetonate, cobalt acetylacetonate, gallium acetylacetonate, beryllium acetylacetonate, zinc acetate, and zinc chloride are preferable, zinc acetylacetonate, aluminum acetylacetonate, zinc acetate, and zinc chloride are more preferable, and zinc acetylacetonate is furthermore preferable.

The compounding amount of a metal compound (B) is 0.001 to 50 parts by mass, preferably 0.01 to 20 parts by mass, and more preferably 0.1 to 10 parts by mass, with respect to 100 parts by mass of a thermoplastic resin (A). When the compounding amount of a metal compound (B) is 0.001 part by mass or more, the molded body obtained comes to have a high light emission intensity. Also, when the compounding amount of a metal compound (B) is 50 parts by mass or less, processing of a gas produced by the decomposition of a metal compound (B) at the time of heating comes to be easy.

Examples of a polyalkylene glycol compound (C) of the present invention include, for example, polyalkylene glycols such as polyethylene glycols, polypropylene glycols, and polytetraethylene glycols; polyalkylene glycol monoalkyl ethers such as polyethylene glycol monomethyl ethers; and polyalkylene glycol dialkyl ethers such as polyethylene glycol dimethyl ethers. This polyalkylene glycol compound (C) may be used alone, or in combination with two or more kinds.

Among these polyalkylene glycol compounds (C), polyalkylene glycols and polyalkylene glycol monoalkyl ethers are preferable because a metal compound (B) is dispersed well. As the alkylene group, ethylene group, propylene group, and tetraethylene group are more preferable.

The alkylene group of a polyalkylene glycol compound (C) of the present invention may have the carbon number of 1 to 20, and may be linear or branched.

The mass average molecular weight of a polyalkylene glycol compound (C) is preferably 100 to 200,000, and more preferably 1,000 to 50,000. When the mass average molecular weight of a polyalkylene glycol compound (C) is 100 or more, the molded body obtained comes to have a good mechanical property. Also, when the mass average molecular weight of a polyalkylene glycol compound (C) is 200,000 or less, it comes to have a good compatibility with a thermoplastic resin (A), whereby the metal oxide comes to be dispersed well in the molded body and the molded body obtained comes to have a high light emission intensity.

The compounding amount of a polyalkylene glycol compound (C) is 0.001 to 30 parts by mass, preferably 0.1 to 25 parts by mass, and more preferably 1.0 to 20 parts by mass, with respect to 100 parts by mass of a thermoplastic resin (A). When the compounding amount of a polyalkylene glycol compound (C) is 0.001 part by mass or more, the molded body obtained comes to have a high light emission intensity. Also, when the compounding amount of a polyalkylene glycol compound (C) is 30 parts by mass or less, it comes to have a good compatibility with a thermoplastic resin (A), and the molded body obtained comes to have a good mechanical property and a good thermal property.

The compounding ratio of a metal compound (B) and a polyalkylene glycol compound (C) can appropriately be selected in view of the light emission property of a molded body obtained. In 100 mass % of the total of a metal compound (B) and a polyalkylene glycol compound (C), it is preferable that the metal compound (B) is 0.1 to 50 mass % and the polyalkylene glycol compound (C) is 50 to 99.9 mass %. It is more preferable that the metal compound (B) is 0.5 to 40 mass % and the polyalkylene glycol compound (C) is 60 to 99.5 mass %. It is furthermore preferable that the metal compound (B) is 1 to 30 mass % and the polyalkylene glycol compound (C) is 70 to 99 mass %.

When the compounding ratio of a metal compound (B) is 0.1 mass % or more, the molded body obtained comes to have a high light emission intensity. Also, when the compounding ratio of a metal compound (B) is 50 mass % or less, the molded body obtained comes to have a good mechanical property and a good thermal property. Also, when the compounding ratio of a polyalkylene glycol compound (C) is 50 mass % or more, the molded body obtained comes to have a good mechanical property and a good thermal property. Also, when the compounding ratio of a polyalkylene glycol compound (C) is 99.9 mass % or less, the molded body obtained comes to have a high light emission intensity.

If needed, an additive such as a plasticizer, a lubricant, a stabilizer, an oxidant inhibitor, an ultraviolet absorber, or a mold release agent besides a thermoplastic resin (A), a metal compound (B) and a polyalkylene glycol compound (C) may be compounded to the composition of the present invention.

A production method of a thermoplastic resin composition of the present invention is not particularly limited as long as it include compounding a thermoplastic resin (A), a metal compound (B), and a polyalkylene glycol compound (C) and heating them at a temperature of 100 to 320° C. Examples thereof include, for example, a method in which a thermoplastic resin (A), a metal compound (B), and a polyalkylene glycol compound (C) are concurrently heated and mixed; a method in which a thermoplastic resin (A) and a polyalkylene glycol compound (C) are heated and mixed, and thereafter a metal compound (B) is heated and mixed; and a method in which a small amount of a thermoplastic resin (A), and a metal compound (B) and a polyalkylene glycol compound (C) are heated and mixed to produce a masterbatch containing the metal compound (B) at a high concentration, and thereafter a remaining thermoplastic resin (A) is heated and mixed.

Among these production methods, a method in which a thermoplastic resin (A) and a polyalkylene glycol compound (C) are heated and mixed, and thereafter a metal compound (B) is heated and mixed is preferable because the molded body obtained comes to have a high light emission intensity.

The thermoplastic resin composition obtained can be pelletized and used as a molding material.

In a method of heating and mixing, a well-known kneading apparatus can be used. Examples thereof include, for example, single-screw extruders, multi-screw extruders having two or more screws, bumbary mixers, kneaders, and rolls. A gas or the like generated by decomposition of a metal compound (B) can be removed by vacuum devolatization using a vent port provided in the apparatus. Also, heating is carried out under an inert atmosphere or a reductive atmosphere away from oxidative atmosphere to control the amount of a defect such as a lattice defect or an oxygen hole of a metal oxide.

A heating temperature of the present invention can appropriately be selected from a range of 100 to 320° C. in view of the kind of a thermoplastic resin (A) and a metal compound (B). For example, when an acrylic resin or a styrene resin is used as a thermoplastic resin (A), from the viewpoint of melt viscosity of a thermoplastic resin (A) and decomposition of a metal compound (B), the temperature is preferably 180 to 300° C., and more preferably 200 to 280° C.

A heating time of the present invention can appropriately be selected in view of the kind of a thermoplastic resin (A) and a metal compound (B), and in view of a heating temperature. For example, when an acrylic resin or a styrene resin is used as a thermoplastic resin (A) and when heating at a temperature of 200 to 280° C. is carried out, from the viewpoint of melt viscosity of a thermoplastic resin (A) and decomposition of a metal compound (B), the time is preferably 10 seconds or longer. From the view point of accelerating decomposition of a metal compound (B), the time is more preferably 30 seconds or longer. As for the upper limit of a heating time, from the view point of decomposition of a thermoplastic resin (A) due to melt kneading, the time is preferably 60 minutes or shorter, and more preferably 30 minutes or shorter.

If needed, a thermoplastic resin composition obtained by a production method of the present invention may include an additive such as such as a plasticizer, a lubricant, a stabilizer, an oxidant inhibitor, an ultraviolet absorber, or a mold release agent.

A molded body and a light emission body of the present invention can be obtained by molding a thermoplastic resin composition of the present invention.

As for a molding method, a well-known molding method can be used. Examples thereof include, for example, injection molding, extrusion molding, blow molding, inflation molding, vacuum forming, compression molding, and foaming molding. Also, after having molded as a film, a biaxially-drawn film, a sheet, an expanded sheet, a foam bead, or the like, it can be molded as a desired molded body.

Molding conditions such as temperature, revolution speed, L/D of the screw, screw configuration, and discharge volume can appropriately be selected. Dispersion state of a metal oxide in a molded body can be controlled.

A molded body and a light emission body of the present invention enable a conversion of an ultraviolet to visible light wavelength and a control of electroconductivity by the band gap control. Therefore, they are expected to be applied in an optical material field or an electronic material field as a topsheet or a sealant of solar cell, a member for organic electroluminescence, a member for liquid crystal, a member for lighting, or the like, and in an agricultural material field as a wavelength conversion sheet.

EXAMPLE

As follows, the present invention is described by Examples, but the present invention is not limited to these Examples. Note that, in the Examples, "part(s)" represents "part(s) by mass". The evaluation of each property shown in the Examples was carried out by a method shown below.

(1) Measurement of Quantum Yield

The surface (10 mm×20 mm) of the molded body obtained (10 mm×20 mm×2 mm) was set in an integrating sphere of an absolute quantum yield measuring apparatus (model name: "PE-1100", made by Otsuka Electronics Co., Ltd.). An excitation light was selected at 10 nm interval from a range of excitation wavelength of 300 to 420 nm, and a light emission spectrum thereat was measured. From the data obtained, the internal quantum yield and the external quantum yield were evaluated. The internal quantum yield was calculated by dividing the number of light emission photons of the molding body by the number of photons absorbed in the molded body among the excitation light irradiated thereto. The external quantum yield was calculated by dividing the number of light emission photons of the molding body by the number of photons of the irradiated excitation light.

(2) Measurement of Light Emission Peak Wavelength

The surface (10 mm×20 mm) of the molded body obtained (10 mm×20 mm×2 mm) was irradiated with an ultraviolet having a peak wavelength of 365 nm using an ultraviolet laser (model name: "handy UV lamp SLUV-4", made by AS ONE Corporation, irradiation intensity at 50 nm distance from a light source: 743 µW/cm$^2$ (365 nm)) as a light source, and the light emission peak wavelength of light released from the side surface (10 mm×2 mm) of the molded body was measured with an optical thin film measurement apparatus (model name: "FilmTek 1000", made by Scientific Computing Int.) as a detector. As for the positions of the molded body, the light source and the detector, the detector was placed at an angle of 90° to the optical axis of the light source, the distance from the light source to the molded body was 30 cm, and the distance from the molded body to the detector was 5 cm. Note that, in FIG. 1, the horizontal axis shows wavelength and the vertical axis shows light emission relative intensity.

Example 1

100 parts of polymethyl methacrylate (trade name: "VHK", made by Mitsubishi Rayon Co., Ltd.) as a thermoplastic resin (A) and 2.5 parts of polyethylene glycol monomethyl ether (made by Fluka, mass average molecular weight: 5000) as a polyalkylene glycol compound (C) were injected into a small injection molding machine (model name: "CS-183MMX", made by Custom Scientific Instruments Inc.), and it was kneaded at a temperature of 220° C. for 1 minute to obtain a pellet.

The pellet obtained was again injected into the small injection molding machine, and it was kneaded at a temperature of 220° C. for 1 minute. After that, 0.5 part of zinc acetylacetonate (made by Tokyo Chemical Industry Co., Ltd.) was injected, and it was kneaded at a temperature of 220° C. for 1 minute. After that, a molded body of 10 mm×20 mm×2 mm was obtained.

Examples 2 to 17 and Comparative Examples 1 to 6

These were carried out in the same manner as in Example 1 except that the kind of the thermoplastic resin (A), the kind and compounding amount of the metal compound (B), and the kind and compounding amount of the polyalkylene glycol compound (C) were changed as shown in Tables 1 to 3, to obtain molded bodies.

The light emission properties of molded bodies obtained in Examples 1 to 17 and Comparative Examples 1 to 6 are shown in Tables 1 to 3. Also, the light emission spectra of molded bodies obtained in Example 1 and Comparative Example 3 are shown in FIG. 1.

TABLE 1

|  |  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Thermoplastic Resin (A) | Kind | | PMMA | PMMA | PMMA | PS | PS | PS | COP | PC | PC |
|  | Part(s) | | 100 | 100 | 100 | 100 | 100 | 100 | 100 | 100 | 100 |
| Metal Compound (B) | Kind | | $Zn(Acac)_2$ | $Zn(Acac)_2$ | $Zn(Acac)_2$ | $Zn(Acac)_2$ | $Zn(OAc)_2$ | $ZnCl_2$ | $Zn(Acac)_2$ | $Zn(OAc)_2$ | $ZnCl_2$ |
|  | Part(s) | | 0.5 | 0.5 | 0.25 | 0.5 | 0.25 | 0.25 | 0.5 | 0.25 | 0.25 |
| Polyalkylene Glycol | Kind | | PEGMME | PEGMME | PEG | PEGMME | PEGMME | PEGMME | PEGMME | PEGMME | PEGMME |
| Compound (C) | Molecular Weight | | 5000 | 5000 | 10000 | 5000 | 5000 | 5000 | 5000 | 5000 | 5000 |
|  | Part(s) | | 2.5 | 10.0 | 10.0 | 10.0 | 2.5 | 2.5 | 10.0 | 2.5 | 2.5 |
| Molding Temperature [° C.] | | | 220 | 220 | 220 | 220 | 220 | 220 | 250 | 250 | 250 |
| Internal Quantum Yield [%] | Excitation Wavelength [nm] | 300 | 1.5 | 0.2 | 0.9 | 3.4 | 3.4 | 3.6 | 0.9 | 3.9 | 0.8 |
|  |  | 310 | 0 | 0.1 | 0.6 | 0.8 | 2.4 | 2.0 | 0.3 | 2.5 | 1.9 |
|  |  | 320 | 0.6 | 0.4 | 0.7 | 1.5 | 2.7 | 2.4 | 0.8 | 2.8 | 2.0 |
|  |  | 330 | 1.0 | 0.7 | 0.7 | 1.7 | 2.5 | 2.1 | 0.6 | 2.8 | 2.4 |
|  |  | 340 | 0.6 | 1.1 | 1.3 | 1.8 | 3.5 | 2.8 | 0.7 | 3.0 | 2.8 |
|  |  | 350 | 0.4 | 1.6 | 1.9 | 2.1 | 3.9 | 3.1 | 0.5 | 4.2 | 3.0 |
|  |  | 360 | 1.0 | 2.9 | 4.1 | 2.7 | 4.6 | 3.8 | 0.1 | 5.1 | 4.1 |
|  |  | 370 | 3.5 | 5.4 | 6.8 | 3.8 | 5.4 | 4.8 | 1.3 | 7.2 | 5.1 |
|  |  | 380 | 8.8 | 9.9 | 9.6 | 4.9 | 6.0 | 5.5 | 0.8 | 10.5 | 6.1 |
|  |  | 390 | 13.6 | 13.5 | 12.8 | 6.9 | 7.8 | 7.8 | 1.8 | 9.3 | 5.4 |
|  |  | 400 | 14.4 | 15.3 | 13.9 | 7.1 | 9.1 | 8.1 | 1.9 | 9.9 | 5.2 |
|  |  | 410 | 16.9 | 17.7 | 16.6 | 7.1 | 10.6 | 8.5 | 1.9 | 6.6 | 3.9 |
|  |  | 420 | 17.6 | 17.8 | 14.2 | 6.2 | 5.2 | 4.9 | 1.1 | 5.5 | 1.8 |
| External Quantum Yield [%] | Excitation Wavelength [nm] | 300 | 1.4 | 0.2 | 0.9 | 3.1 | 3.1 | 3.3 | 0.9 | 3.5 | 0.7 |
|  |  | 310 | 0 | 0.1 | 0.6 | 0.7 | 2.2 | 1.8 | 0.3 | 2.2 | 1.7 |
|  |  | 320 | 0.6 | 0.4 | 0.7 | 1.4 | 2.4 | 2.1 | 0.7 | 2.5 | 1.7 |
|  |  | 330 | 1.0 | 0.6 | 0.6 | 1.6 | 2.2 | 1.8 | 0.6 | 2.4 | 1.9 |
|  |  | 340 | 0.5 | 1.0 | 1.1 | 1.6 | 3.0 | 2.5 | 0.7 | 2.4 | 2.0 |
|  |  | 350 | 0.4 | 1.5 | 1.5 | 1.9 | 3.3 | 2.7 | 0.5 | 3.2 | 2.1 |
|  |  | 360 | 0.9 | 2.7 | 3.0 | 2.4 | 3.7 | 3.2 | 0.1 | 3.6 | 2.5 |
|  |  | 370 | 3.2 | 5.1 | 4.4 | 3.3 | 4.0 | 3.9 | 1.2 | 4.7 | 2.9 |
|  |  | 380 | 7.1 | 9.0 | 5.6 | 4.1 | 3.8 | 4.2 | 0.7 | 6.1 | 3.1 |
|  |  | 390 | 9.9 | 12.0 | 7.0 | 5.7 | 4.1 | 5.3 | 1.6 | 4.9 | 2.6 |
|  |  | 400 | 9.7 | 13.3 | 7.0 | 5.6 | 4.1 | 5.0 | 1.6 | 4.7 | 2.3 |
|  |  | 410 | 10.6 | 14.9 | 7.8 | 5.4 | 4.3 | 4.8 | 1.5 | 2.9 | 1.6 |
|  |  | 420 | 10.0 | 14.0 | 6.0 | 4.4 | 1.8 | 2.5 | 0.9 | 2.2 | 0.7 |

TABLE 2

|  |  |  | Ex. 10 | Ex. 11 | Ex. 12 | Ex. 13 | Ex. 14 | Ex. 15 | Ex. 16 | Ex. 17 |
|---|---|---|---|---|---|---|---|---|---|---|
| Thermoplastic Resin (A) | Kind | | PMMA | PMMA | PMMA | PMMA | PMMA | PMMA | PMMA | PMMA |
|  | Part(s) | | 100 | 100 | 100 | 100 | 100 | 100 | 100 | 100 |
| Metal Compound (B) | Kind | | $Zn(Acac)_2$ | $Zn(Acac)_2$ | $Zn(Acac)_2$ | $Zn(Acac)_2$ | $Zn(Acac)_2$ | $Zn(Acac)_2$ | $Zn(Acac)_2$ | $Zn(Acac)_2$ |
|  | Part(s) | | 0.5 | 0.5 | 0.5 | 0.5 | 0.5 | 0.5 | 0.5 | 0.5 |
| Polyalkylene Glycol | Kind | | TPG | TPG | PTG | PTG | PPG | PPG | PEGMME | PEGMME |
| Compound (C) | Molecular Weight | | 192 | 192 | 2000 | 2000 | 4000 | 4000 | 350 | 2000 |
|  | Part(s) | | 2.5 | 5.0 | 2.5 | 5.0 | 2.5 | 5.0 | 2.5 | 2.5 |
| Molding Temperature [° C.] | | | 220 | 220 | 220 | 220 | 220 | 220 | 220 | 220 |
| Internal Quantum Yield [%] | Excitation Wavelength [nm] | 300 | 0 | 0 | 1.1 | 0.8 | 0 | 0.6 | 0.8 | 0.8 |
|  |  | 310 | 0.1 | 0.1 | 0.3 | 0.6 | 0 | 0 | 0 | 0.2 |
|  |  | 320 | 0.1 | 0.1 | 0.4 | 0.5 | 0.2 | 0.7 | 0.2 | 0 |
|  |  | 330 | 0.5 | 0 | 0.7 | 1.0 | 0.3 | 1.0 | 0.2 | 0 |
|  |  | 340 | 0.2 | 0 | 0.7 | 0.7 | 0.1 | 1.1 | 0.3 | 0.2 |
|  |  | 350 | 0.1 | 0 | 1.0 | 1.7 | 0 | 1.3 | 0.7 | 0.2 |
|  |  | 360 | 0.5 | 0 | 1.1 | 2.2 | 0.9 | 2.7 | 1.0 | 0.6 |
|  |  | 370 | 1.7 | 1.8 | 3.4 | 5.9 | 2.1 | 6.5 | 2.8 | 1.4 |

TABLE 2-continued

|  |  |  | Ex. 10 | Ex. 11 | Ex. 12 | Ex. 13 | Ex. 14 | Ex. 15 | Ex. 16 | Ex. 17 |
|---|---|---|---|---|---|---|---|---|---|---|
|  |  | 380 | 6.2 | 6.9 | 9.0 | 11.3 | 6.6 | 11.1 | 11.7 | 7.5 |
|  |  | 390 | 14.9 | 15.1 | 13.8 | 17.4 | 9.7 | 16.6 | 20.4 | 18.9 |
|  |  | 400 | 18.3 | 17.0 | 10.9 | 20.8 | 11.5 | 18.2 | 21.6 | 23.6 |
|  |  | 410 | 19.2 | 18.6 | 18.7 | 24.1 | 14.2 | 19.2 | 26.6 | 26.5 |
|  |  | 420 | 18.0 | 23.0 | 12.9 | 24.3 | 13.5 | 20.7 | 25.7 | 27.2 |
| External Quantum Yield [%] | Excitation Wavelength [nm] | 300 | 0 | 0 | 1.0 | 0.8 | 0 | 0.6 | 0.8 | 0.7 |
|  |  | 310 | 0.1 | 0.1 | 0.3 | 0.6 | 0 | 0 | 0 | 0.2 |
|  |  | 320 | 0.1 | 0.1 | 0.4 | 0.5 | 0.2 | 0.6 | 0.2 | 0 |
|  |  | 330 | 0.4 | 0 | 0.6 | 0.9 | 0.3 | 1.0 | 0.2 | 0 |
|  |  | 340 | 0.2 | 0 | 0.7 | 0.7 | 0.1 | 1.0 | 0.3 | 0.2 |
|  |  | 350 | 0 | 0 | 0.9 | 1.6 | 0 | 1.2 | 0.7 | 0.2 |
|  |  | 360 | 0.5 | 0 | 1.0 | 2.1 | 0.8 | 2.5 | 1.0 | 0.6 |
|  |  | 370 | 1.3 | 1.4 | 2.8 | 5.4 | 1.8 | 5.8 | 2.5 | 1.3 |
|  |  | 380 | 3.0 | 3.3 | 5.8 | 9.9 | 4.2 | 8.9 | 7.7 | 6.3 |
|  |  | 390 | 5.2 | 5.1 | 7.5 | 14.3 | 5.1 | 12.3 | 10.9 | 13.2 |
|  |  | 400 | 5.4 | 4.6 | 5.1 | 16.0 | 5.1 | 12.4 | 10.4 | 15.1 |
|  |  | 410 | 5.0 | 4.4 | 7.7 | 17.2 | 5.5 | 12.1 | 11.6 | 15.6 |
|  |  | 420 | 4.0 | 4.6 | 4.5 | 15.4 | 4.4 | 11.6 | 9.6 | 13.9 |

TABLE 3

|  |  | Com. Ex. 1 | Com. Ex. 2 | Com. Ex. 3 | Com. Ex. 4 | Com. Ex. 5 | Com. Ex. 6 |
|---|---|---|---|---|---|---|---|
| Thermoplastic Resin (A) | Kind | PMMA | PMMA | PMMA | PS | COP | PC |
|  | Part(s) | 100 | 100 | 100 | 100 | 100 | 100 |
| Metal Compound (B) | Kind | — | $Zn(Acac)_2$ | $Zn(Acac)_2$ | $Zn(Acac)_2$ | $Zn(Acac)_2$ | $Zn(Acac)_2$ |
|  | Part(s) | — | 0.25 | 0.5 | 0.5 | 0.5 | 0.25 |
| Polyalkylene Glycol Compound (C) | Kind | — | — | — | — | — | — |
|  | Molecular Weight | — | — | — | — | — | — |
|  | Part(s) | — | — | — | — | — | — |
| Molding Temperature [° C.] |  | 220 | 220 | 220 | 220 | 250 | 250 |
| Internal Quantum Yield [%] | Excitation Wavelength [nm] | 300 | 0 | 0.3 | 0 | 0 | 0 | 1.3 |
|  |  | 310 | 0 | 0 | 0 | 0 | 0 | 1.2 |
|  |  | 320 | 0 | 0 | 0 | 0 | 0 | 1.4 |
|  |  | 330 | 0 | 0 | 0 | 0 | 0 | 1.4 |
|  |  | 340 | 0 | 0.1 | 0 | 0 | 0.1 | 1.5 |
|  |  | 350 | 0 | 0 | 0 | 0.1 | 0.2 | 1.8 |
|  |  | 360 | 0 | 0 | 0.1 | 0 | 0 | 2.1 |
|  |  | 370 | 0 | 0.5 | 0.2 | 0 | 0.1 | 3.1 |
|  |  | 380 | 0 | 2.8 | 1.1 | 0.7 | 0.4 | 4.8 |
|  |  | 390 | 0 | 6.5 | 3.9 | 2.3 | 0.7 | 4.2 |
|  |  | 400 | 0 | 8.8 | 4.8 | 2.8 | 1.1 | 4.9 |
|  |  | 410 | 0 | 10.0 | 6.2 | 2.6 | 0.4 | 3.3 |
|  |  | 420 | 0 | 9.7 | 5.7 | 2.6 | 0.6 | 2.7 |
| External Quantum Yield [%] | Excitation Wavelength [nm] | 300 | 0 | 0.3 | 0 | 0 | 0 | 1.2 |
|  |  | 310 | 0 | 0 | 0 | 0 | 0 | 1.1 |
|  |  | 320 | 0 | 0 | 0 | 0 | 0 | 1.2 |
|  |  | 330 | 0 | 0 | 0 | 0 | 0 | 1.2 |
|  |  | 340 | 0 | 0.1 | 0 | 0 | 0.1 | 1.2 |
|  |  | 350 | 0 | 0 | 0 | 0.1 | 0.2 | 1.3 |
|  |  | 360 | 0 | 0 | 0.1 | 0 | 0 | 1.5 |
|  |  | 370 | 0 | 0.5 | 0.2 | 0 | 0.1 | 2.0 |
|  |  | 380 | 0 | 1.8 | 0.9 | 0.5 | 0.3 | 2.8 |
|  |  | 390 | 0 | 2.7 | 2.4 | 1.3 | 0.6 | 2.2 |
|  |  | 400 | 0 | 3.0 | 2.5 | 1.2 | 0.8 | 2.3 |
|  |  | 410 | 0 | 3.0 | 2.9 | 1.0 | 0.3 | 1.4 |
|  |  | 420 | 0 | 2.4 | 2.3 | 0.8 | 0.4 | 1.1 |

Note that, the abbreviations described in Tables 1 to 3 represent the following compounds.
"PMMA": polymethyl methacrylate (trade name: VHK, made by Mitsubishi Rayon Co., Ltd.)
"PS": polystyrene (trade name: Toyo styrol G200C, made by Toyo Stylene Co., Ltd.)
"COP": cycloolefin resin (trade name: ZEONOR 1420R, made by Zeon Corporation)
"PC": polycarbonate resin (trade name: Panlite L-1250WP, made by Teijin Chemicals Ltd.)
"$Zn(Acac)_2$": zinc acetylacetonate
"$Zn(OAc)_2$": zinc acetate
"$ZnCl_2$": zinc chloride
"PEGMME": polyethylene glycol monomethyl ether
"PEG": polyethylene glycol
"TPG": tripropylene glycol
"PTG": polytetraethylene glycol (trade name: UNIOL PB-2000R, made by NOF Corporation)
"PPG": polypropylene glycol ((trade name: UNIOL D-4000, made by NOF Corporation)

As is clear from Tables 1 to 3, the molded bodies obtained in Examples 1 to 17 had a high light emission intensity. The molded bodies obtained in Comparative Examples 2 to 6, in which no polyalkylene glycol compound (C) was compounded, had a low light emission intensity. The molded body obtained in Comparative Example 1, in which no metal compound (B) and polyalkylene glycol compound (C) were compounded, did not emit light.

INDUSTRIAL APPLICABILITY

A molded body and a light emission body of the present invention enable a conversion of an ultraviolet to visible light wavelength and a control of electroconductivity by the band gap control, and are expected to be applied in an optical material field or an electronic material field, such as a solar cell, an organic electroluminescence, a liquid crystal, and the like.

What is claimed is:

1. A method of producing an acrylic resin (A) composition comprising: compounding 0.001 to 50 parts by mass of metal compound (B) comprising a metal halide (B2), and 0.001 to 30 parts by mass of a polyalkylene glycol compound (C), with respect to 100 parts by mass of the acrylic resin (A); and heating them at a temperature of 100 to 320° C.

2. The method of claim 1, wherein the metal of the metal compound (B) is zinc.

3. The method of claim 1, wherein the acrylic resin (A) is selected from the group consisting of polymethyl methacrylates, acrylic resins obtained by copolymerization of methyl methacrylate with one or more additional monomers, polymers containing acrylates or methacrylates as a main component, acrylic resins obtained by graft copolymerization of a polymer containing a rubber, with at least one additional monomer, and mixtures thereof.

4. The method of claim 1, wherein the acrylic resin (A) has a mass average molecular weight of 1,000 to 1,000,000.

5. The method of claim 1, wherein the acrylic resin (A) has a mass average molecular weight of 5,000 to 800,000.

6. The method of claim 1, wherein the acrylic resin (A) has a mass average molecular weight of 10,000 to 500,000.

7. The method of claim 1, wherein the metal compound (B) comprises the metal complex (B1).

8. The method of claim 1, wherein the polyalkylene glycol compound (C) is selected from the group consisting of polyalkylene glycols, polyalkylene glycol monoalkyl ethers, polyalkylene glycol dialkyl ethers and mixtures thereof.

9. The method of claim 1, further comprising molding the acrylic resin composition to obtain a molded body.

10. The method of claim 2, further comprising molding the acrylic resin composition to obtain a molded body.

11. The method of claim 9, further comprising incorporating the molded body into a light emission body.

\* \* \* \* \*